United States Patent
Zuniga Lara

(10) Patent No.: US 12,042,912 B2
(45) Date of Patent: Jul. 23, 2024

(54) DEVICE FOR REMOVING WALL PLUGS

(71) Applicant: Ricardo Isidro Zuniga Lara, Queretaro (MX)

(72) Inventor: Ricardo Isidro Zuniga Lara, Queretaro (MX)

(*) Notice: Subject to any disclaimer, the term of this patent is extended or adjusted under 35 U.S.C. 154(b) by 189 days.

(21) Appl. No.: 17/758,649

(22) PCT Filed: Jan. 22, 2021

(86) PCT No.: PCT/MX2021/050004
§ 371 (c)(1),
(2) Date: Jul. 12, 2022

(87) PCT Pub. No.: WO2021/154066
PCT Pub. Date: Aug. 5, 2021

(65) Prior Publication Data
US 2023/0042971 A1 Feb. 9, 2023

(30) Foreign Application Priority Data
Jan. 30, 2020 (MX) .................. MX/u/2020/000042

(51) Int. Cl.
*B25B 27/00* (2006.01)
*B25B 27/14* (2006.01)

(52) U.S. Cl.
CPC .................... *B25B 27/14* (2013.01)

(58) Field of Classification Search
CPC ....... B25B 27/00; B25B 27/14; B25B 27/146; B25B 27/023; F16B 13/00; F16B 13/143
See application file for complete search history.

(56) References Cited

U.S. PATENT DOCUMENTS 4,652,193 A * 3/1987 Hibbs .................. F16B 13/143
  52/707
7,124,459 B1 * 10/2006 Croisdale ............... B23B 51/00
  7/158

(Continued)

FOREIGN PATENT DOCUMENTS

DE         19520308       12/1996
DE       202005012855     10/2005

(Continued)

OTHER PUBLICATIONS

Dubelix: "Entfernt den Dübel fix!", Youtube, Feb. 4, 2020 (Feb. 4, 2020), Retrieved from the Internet <URL: https://www.youtube.com/watch?v=c7wDtYZsAIA.

*Primary Examiner* — Lee D Wilson
(74) *Attorney, Agent, or Firm* — Defillo & Associates, Inc.; Evelyn A. Defillo

(57) ABSTRACT

A device for removing wall plugs from the walls. The device has 2 main elements, a double-headed screw and a hub, which together are manually operated to remove the wall plugs from the walls easily and without damage to the surfaces. The set of the screw for removing wall plugs and the hub is called the device for removing wall plugs. The device for removing wall plugs is made up of 2 elements: a screw for removing wall plugs and an extractor hub. These 2 elements are coupled so that the device for removing wall plugs works properly. The screw for removing wall plugs is a longitudinal element with double head. It features a screw rope, a manual turning head and an electric turning head.

4 Claims, 12 Drawing Sheets

(56) References Cited

U.S. PATENT DOCUMENTS

| | | | |
|---|---|---|---|
| 8,893,372 B2 * | 11/2014 | Fanourgiakis | B25D 17/005 |
| | | | 81/177.85 |
| 2013/0216764 A1 * | 8/2013 | Pasini | F16B 35/00 |
| | | | 425/468 |
| 2023/0042971 A1 * | 2/2023 | Zuniga Lara | B25B 27/14 |

FOREIGN PATENT DOCUMENTS

| | | |
|---|---|---|
| DE | 202019001511 | 5/2019 |
| GB | 2492764 | 1/2013 |

\* cited by examiner

DEVICE FOR REMOVING WALL PLUGS

CROSS REFERENCE TO RELATED APPLICATION

This application is a national stage entry of PCT/MX2021/050004 filed Jan. 22, 2021, under the International Convention and claiming priority over Mexican Patent Application No. MX/u/2020/000042 filed Jan. 30, 2020.

FIELD OF THE INVENTION

The present invention is a tool for removing wall plugs from the walls without damaging the surface, and can be used with hand or power tools.

BACKGROUND OF THE INVENTION

The wall plugs are elements used in the construction sector that serves to ensure and reinforce the fastening of the screws in a place or structural element such as a wall, a panel, a piece of furniture, etc. There are several types of wall plugs each one with a specific use.

The wall plugs are made of different manufacturing materials according to its use; there are usually found in plastic or metal.

For the use of the wall plugs a hole is made with a drill before introducing the wall plugs that will receive the screw. The diameter of the drill bit should be equal to that of the wall plugs. In general, you have to drill only the length of the wall plugs, and to do so it is advisable to paint a mark on the drill bit. To finish, the wall plugs must be pushed to the front surface of the hole.

Immediately, a screw is inserted into the wall plugs that will be used to fix some structural element.

In many cases the screw reaches the end of its useful life and it is necessary to remove it. The wall plug is inserted deposed from this action.

TECHNICAL PROBLEM TO BE SOLVED

Once the used screw is removed, the wall plugs is fixed inside the wall, the panel, the furniture, or any surface where it has been perforated. Commonly the wall plugs is extracted to fill the gap or detail the surface for esthetic purposes.

In order to extract the wall plugs, different non-specialized tools are used for this purpose such as corkscrews, tweezers, disassemblers, etc.

The use of these tools for the extraction of wall plugs requires applying a lot force to press some part of the wall plugs and pull it off, which damages the surface where has been inserted.

The device and method for removing wall plugs proposed in this invention, allows the extraction of wall plugs from any surface, of simple way, fast, effortlessly and without damaging the perforated surface.

SUMMARY OF THE INVENTION

The device for removing wall plugs is a system made up of 2 elements: a screw removing wall plugs and an extractor hub. Both are coupled and inserted into the hole where it is finding the wall plugs. Subsequently, a tool is used to rotate it and start remove the wall plugs.

In order to turn the screw removing wall plugs, a mechanical manual tool can be used, such as tweezers, parakeet, pressure wrench, etc., or a power tool to turn faster, such as an electric screwdriver with a hexagonal tip.

DETAILED DESCRIPTION OF THE INVENTION

Figure 1:
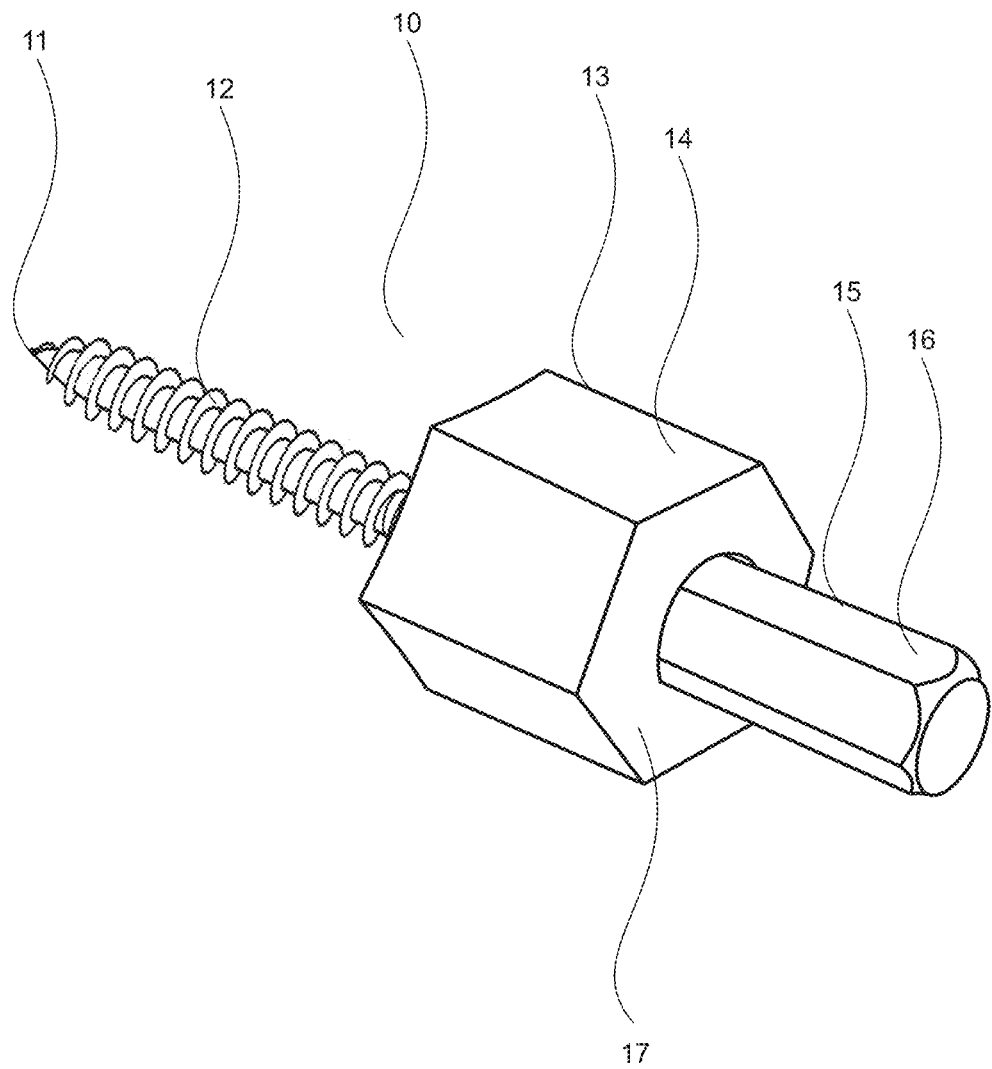
FIG. 1. Shows the perspective view of a screw for removing wall plugs (10)
Figure 2:
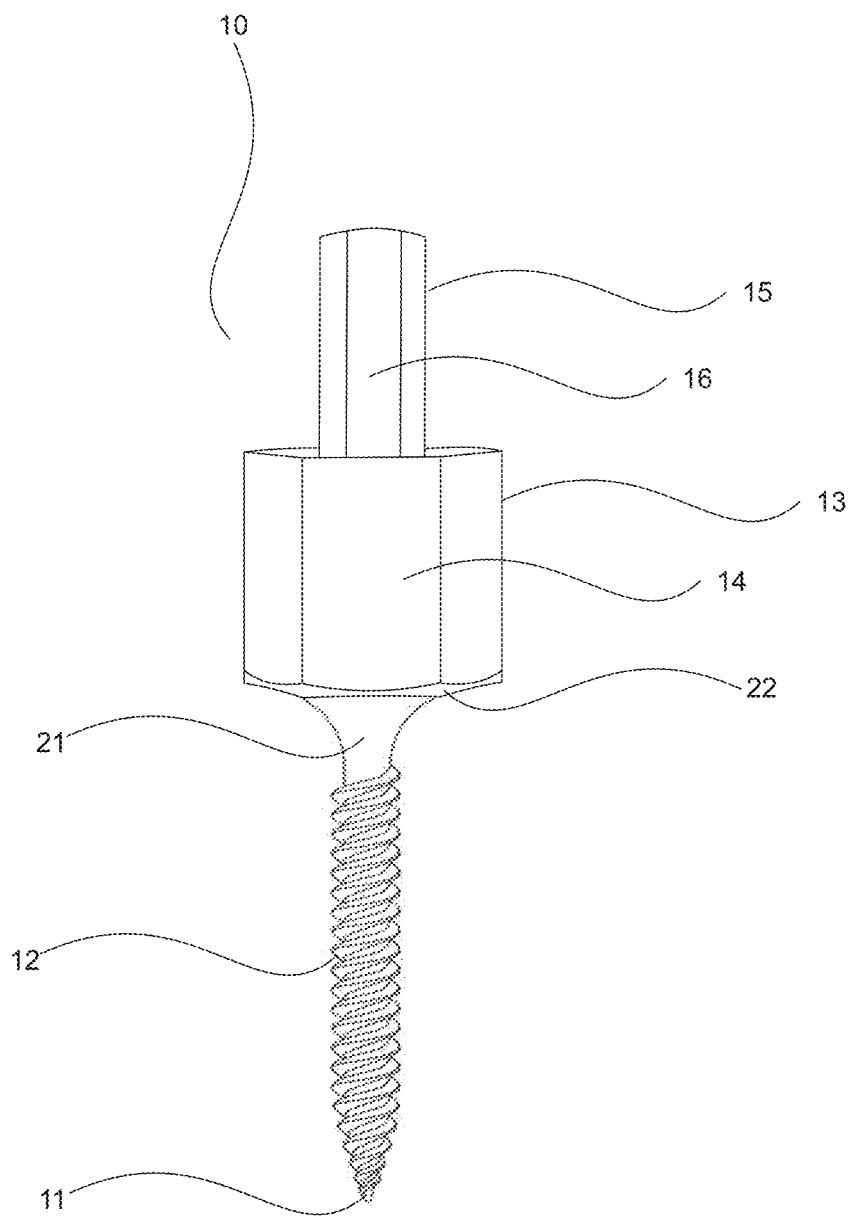
FIG. 2. Shows the front view of a screw for removing wall plugs (10)
Figure 3:
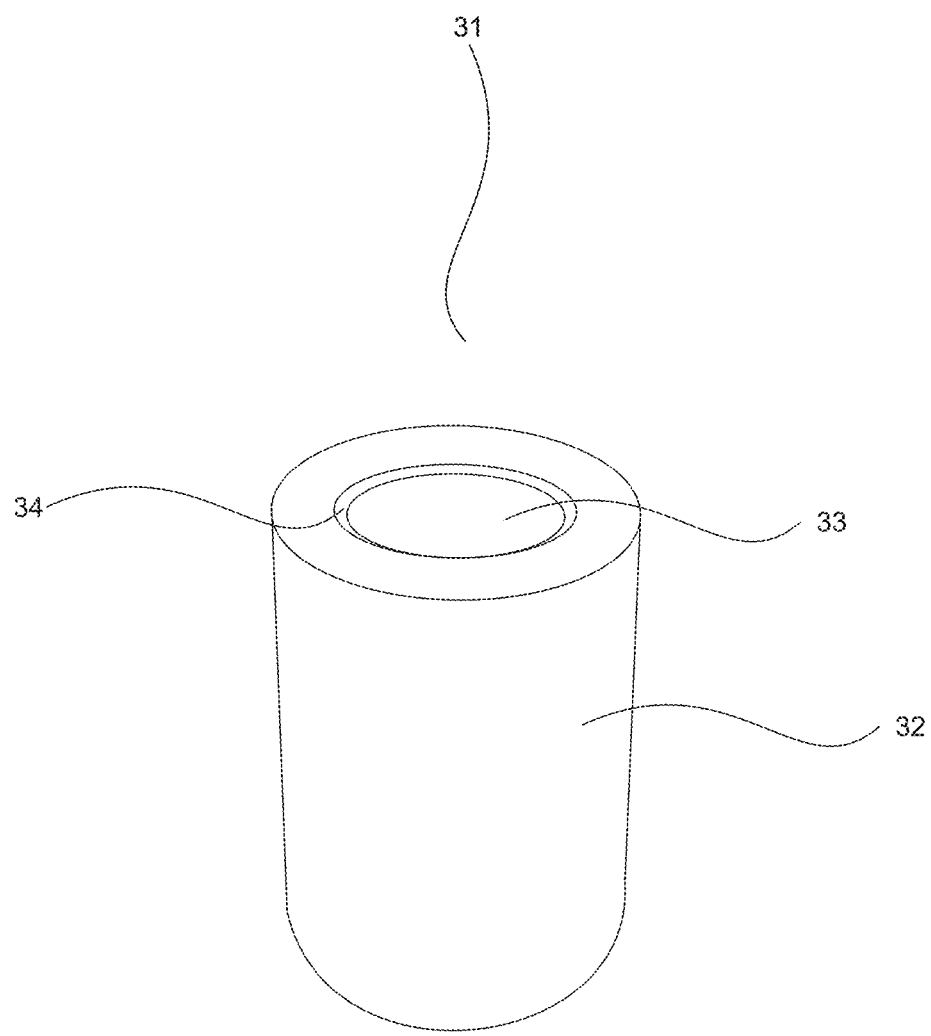
FIG. 3. Shows the front view of an extractor bushing (31)
Figure 4:
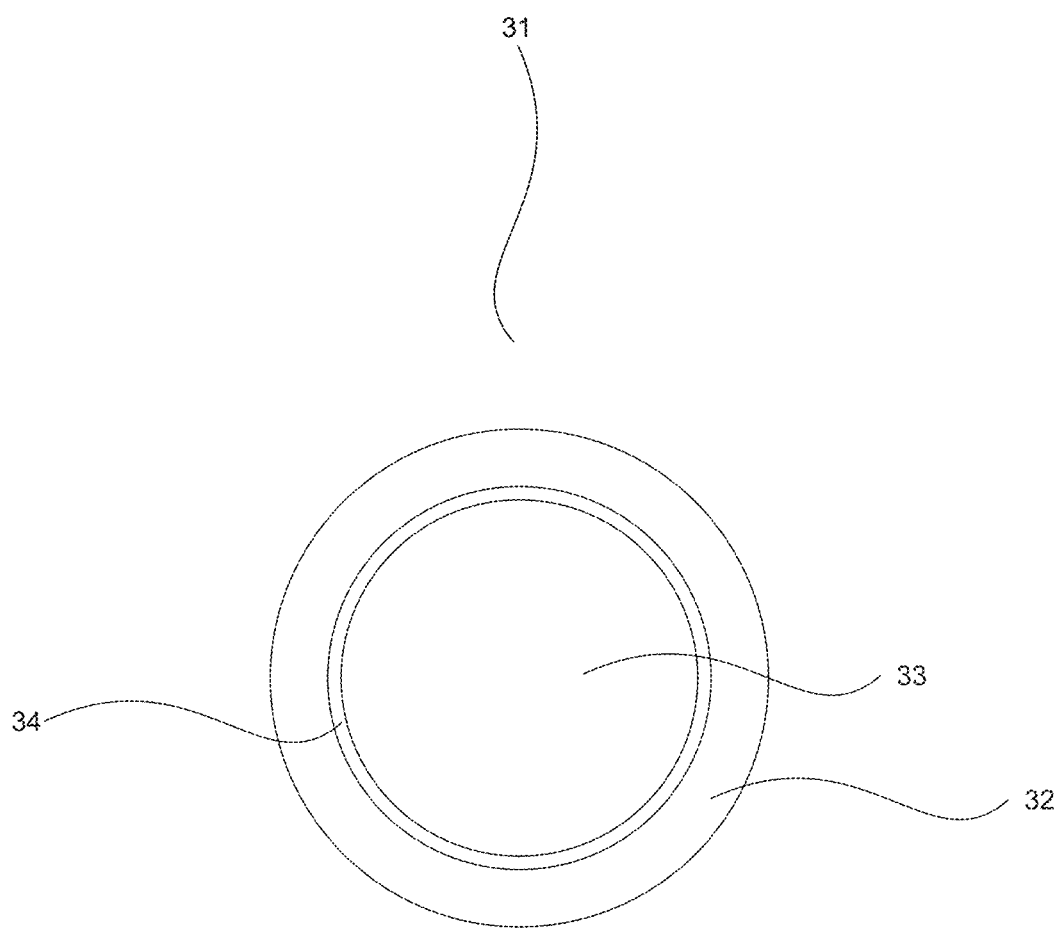
FIG. 4. Shows the top view of an extractor bushing (31)

The present invention consists of a system or tool designed for the extraction of wall plugs. This wall plugs extraction system is called the device for removing wall plugs (51).

The Removing wall plugs System (51) includes 2 elements: a screw for removing wall plugs (10) and an extractor bushing (31). These 2 elements are coupled so that the device for removing wall plugs (51) can work properly.

The screw for removing wall plugs (10) is a longitudinal element with double head. It has a screw rope (12), a manual turning Head (13) and an electric turning head (15).

The screw rope (12) is a longitudinal element with external threading that it serves for insertion into the Wall plugs (61). In one of its parts it has a screw tip (11), which is a conical element with external threading that it serves to drill and break some residue inside the Wall plugs (61). In the other end of the screw rope (12) there is an expansion radius (21) with which it joins the manual turning head (13). The expansion radius (21) is a conical element with the largest radius attached to the manual turning head (13). The function of the expansion radius is to open and break the extracted part of the wall plug.

The manual turning head is an element with 6 Sides of manual head (14). At one end it is attached to the expansion radius (21) and at the other end to the electric turning head (15), by means of its head base (17). The base head is ideally hexagonal type, i.e. 6-sided, but can be of 4, 5, 6, or more sides.

The diameter or width of the head base (17) always must be greater than the radius of the extractor bushing (31) for proper operation of the device for removing wall plugs (51).

At the base of the head (17) there is the electric turning head (15), which it is ideally 6-sided, but can be 4, 5, 6 or more sides.

The manual turning head (13) and electric turning head (15) ideally have the same number of sides, but they can also have a different number of sides each one. The manual turning head (13) must always have a radius or width greater than that of the electric turning head (15).

The extractor bushing (31) is a cylindrical element, with an inner hollow called extraction tunnel (33) that serves as a coupling to insert the screw for removing wall plug (10). The extractor bushing has (31) a bushing side (32) which must always have a diameter smaller than that of the manual turning head (13).

The extractor bushing (31) has two identical ends. Both extremes have an angle of centering (34) which is a reduction in diameter outside to the inner diameter of the bushing side (32).

Figure 5:
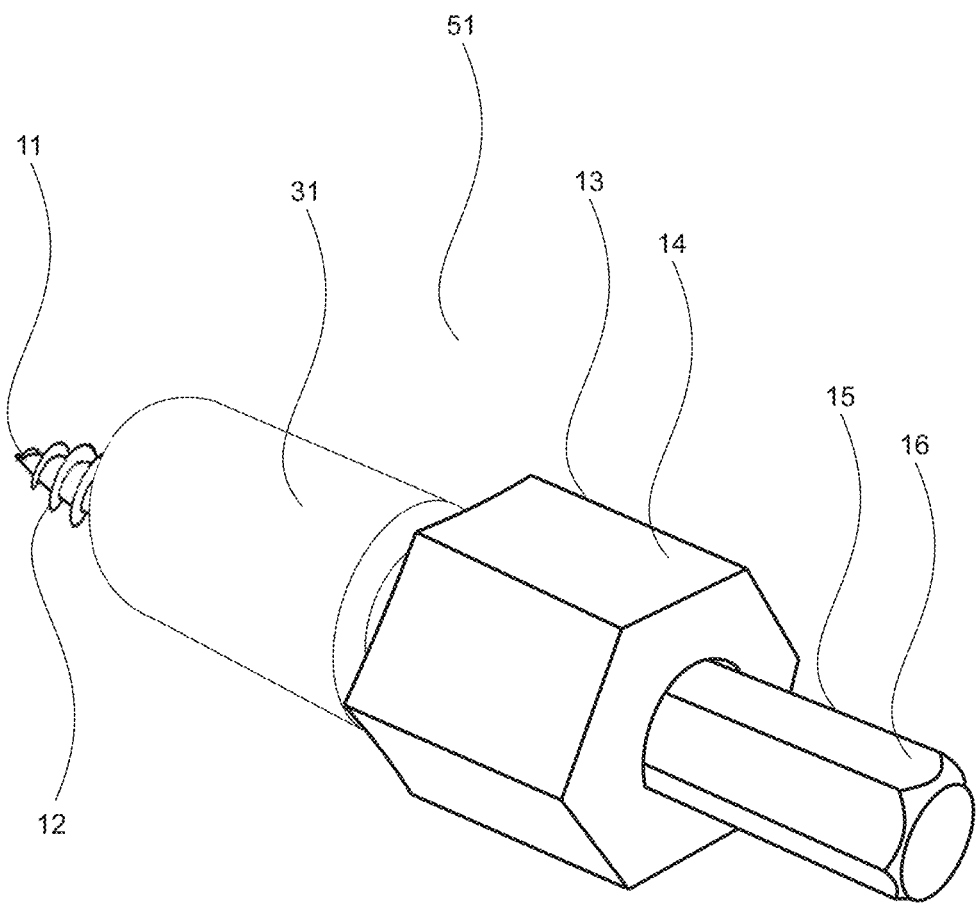
FIG. 5. Shows the perspective view of the device for removing wall plugs (51)
Figure 6:
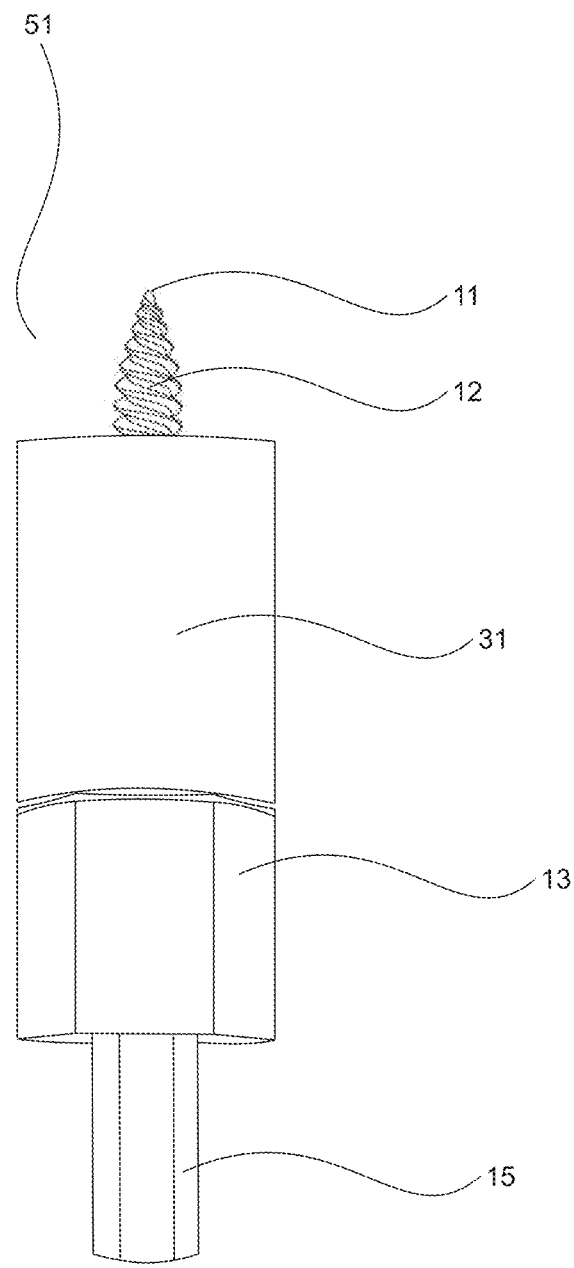
FIG. 6. Shows the front view of the device for removing wall plugs (51)
Figure 7:
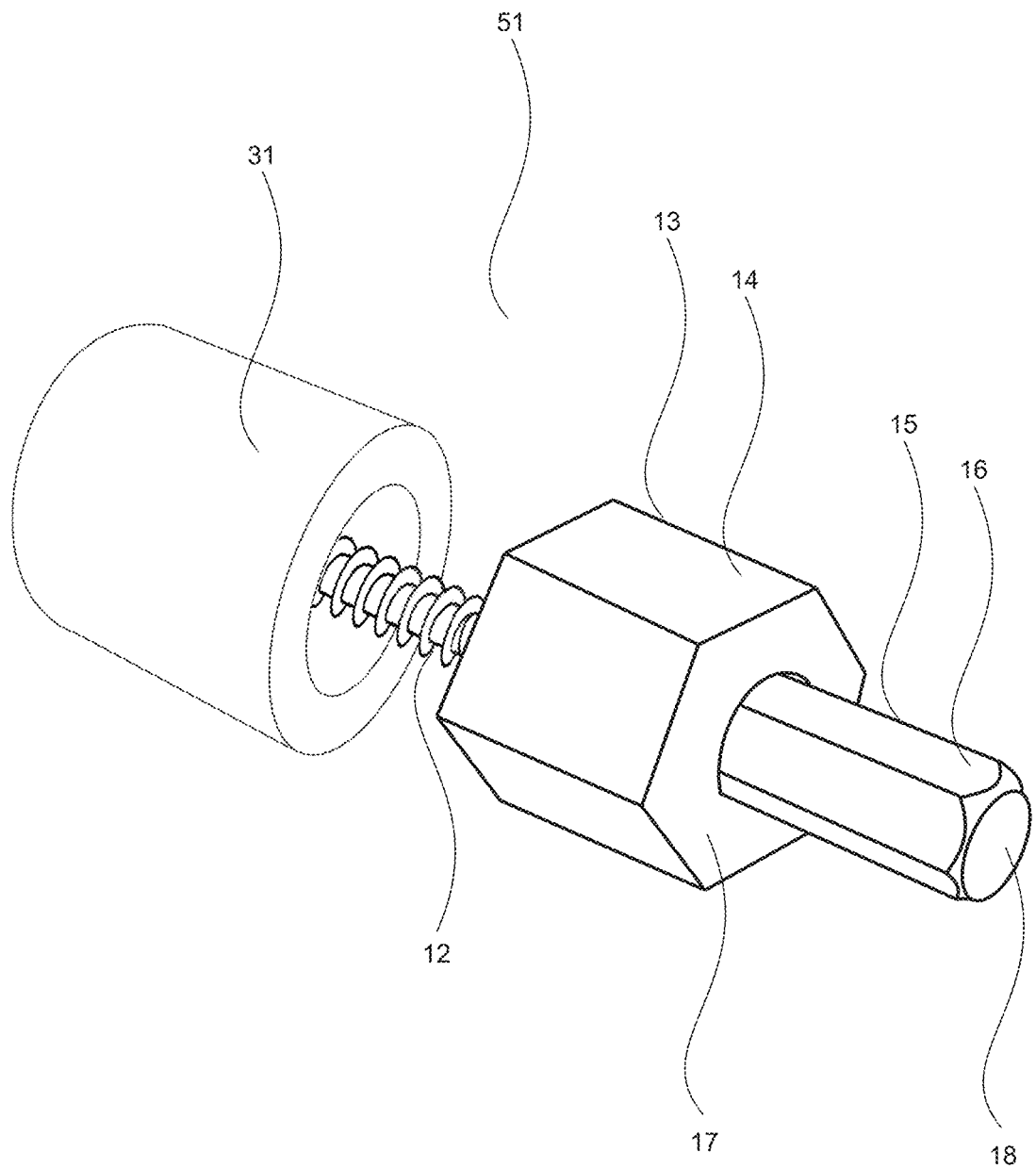
FIG. 7. Shows the perspective view of the device for removing wall plugs (51) and how its 2 elements are coupled.
Figure 8:
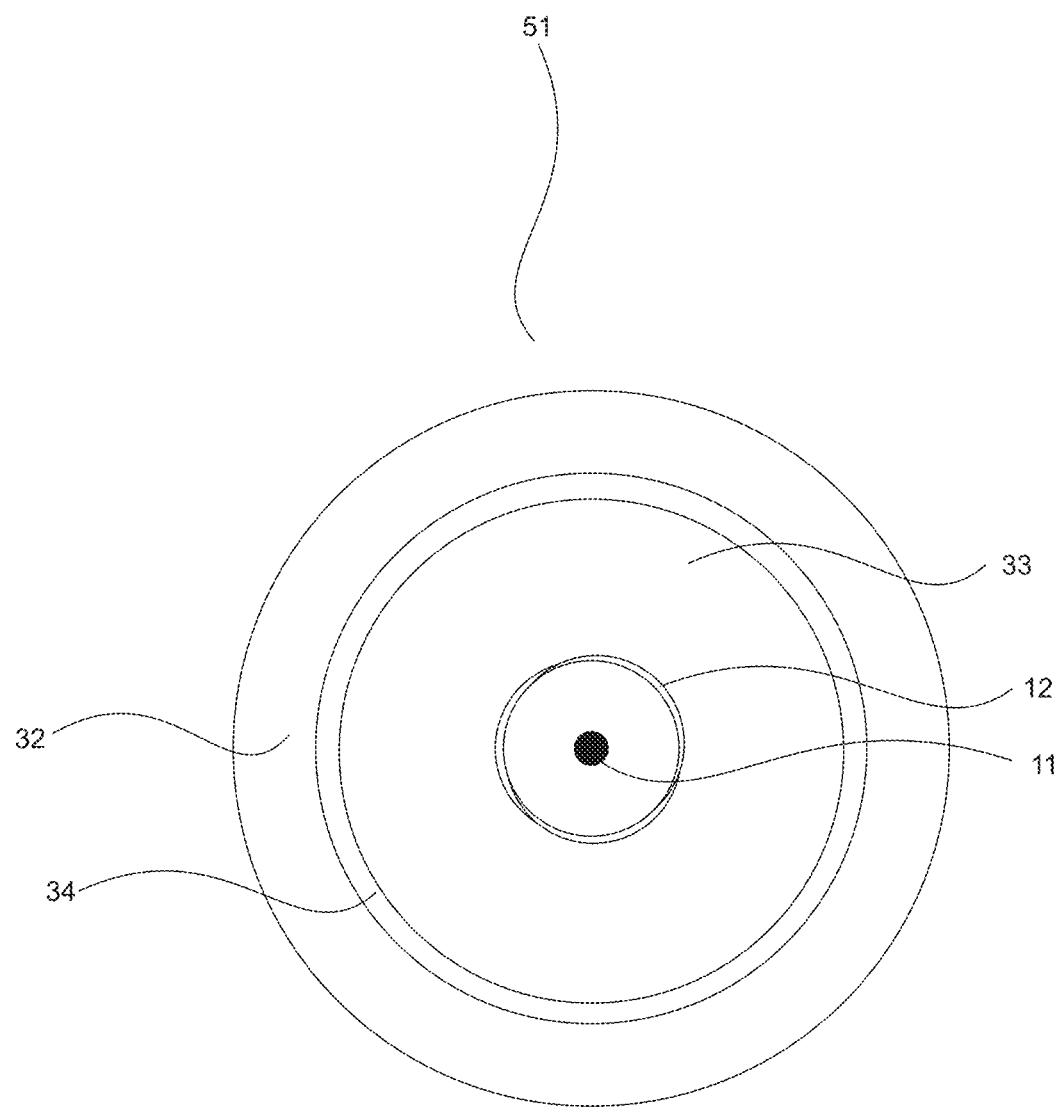
FIG. 8. Shows the top view of the device for removing wall plugs (51)
Figure 9:
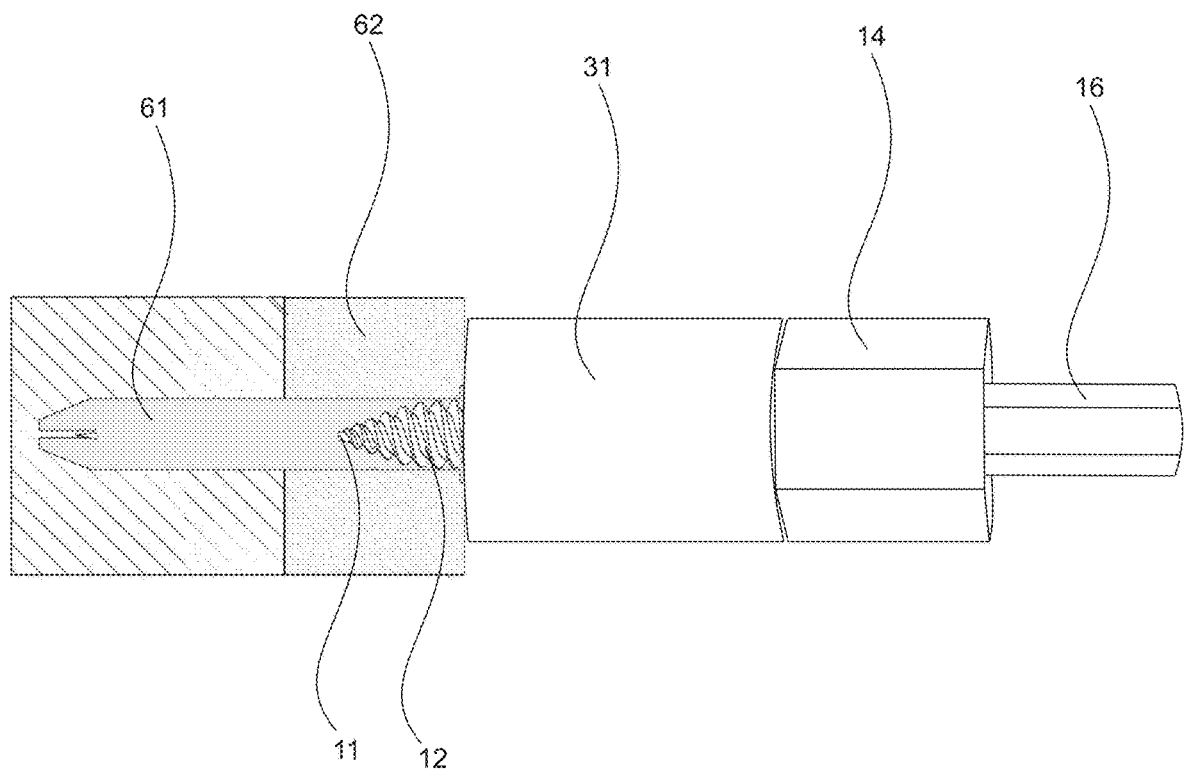
FIG. 9. Shows the side view of how the device for removing wall plugs is inserted (51) in a wall plug (61)
Figure 10:
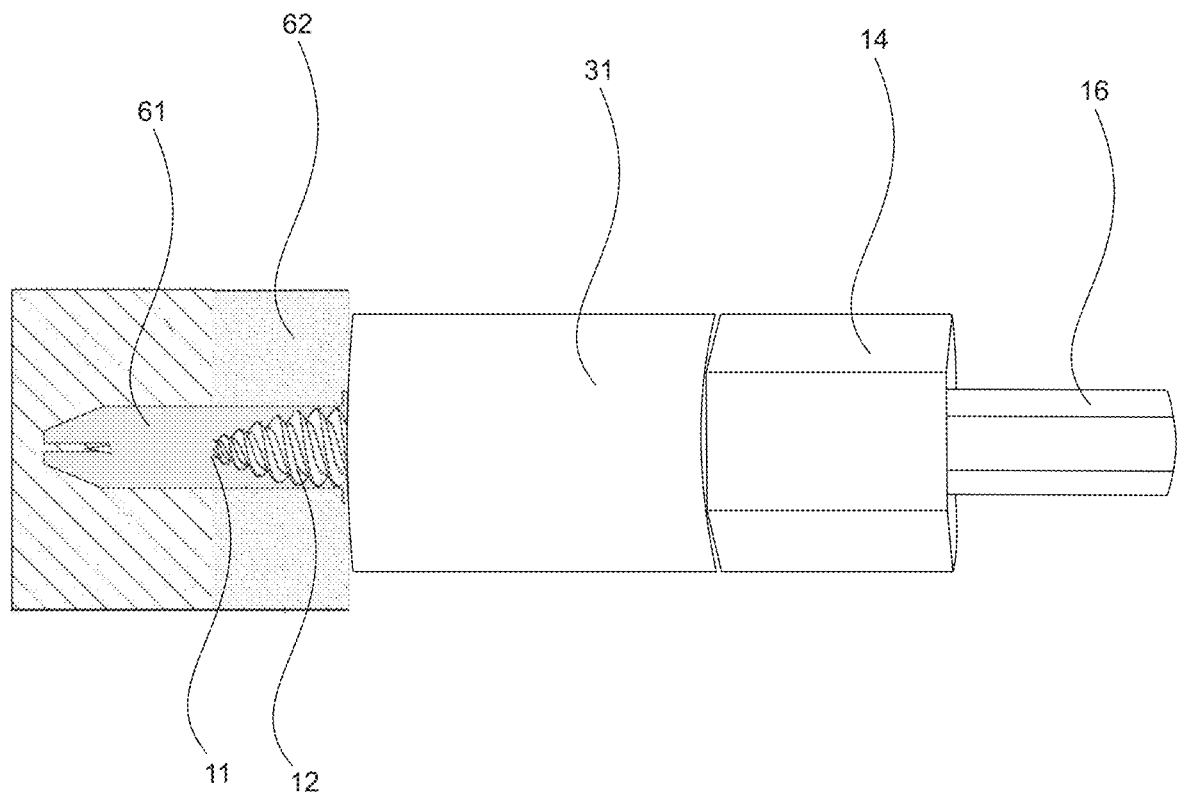
FIG. 10. Shows the side view of how the wall plug (61) is extracted with the device for removing wall plugs (51)
Figure 11:
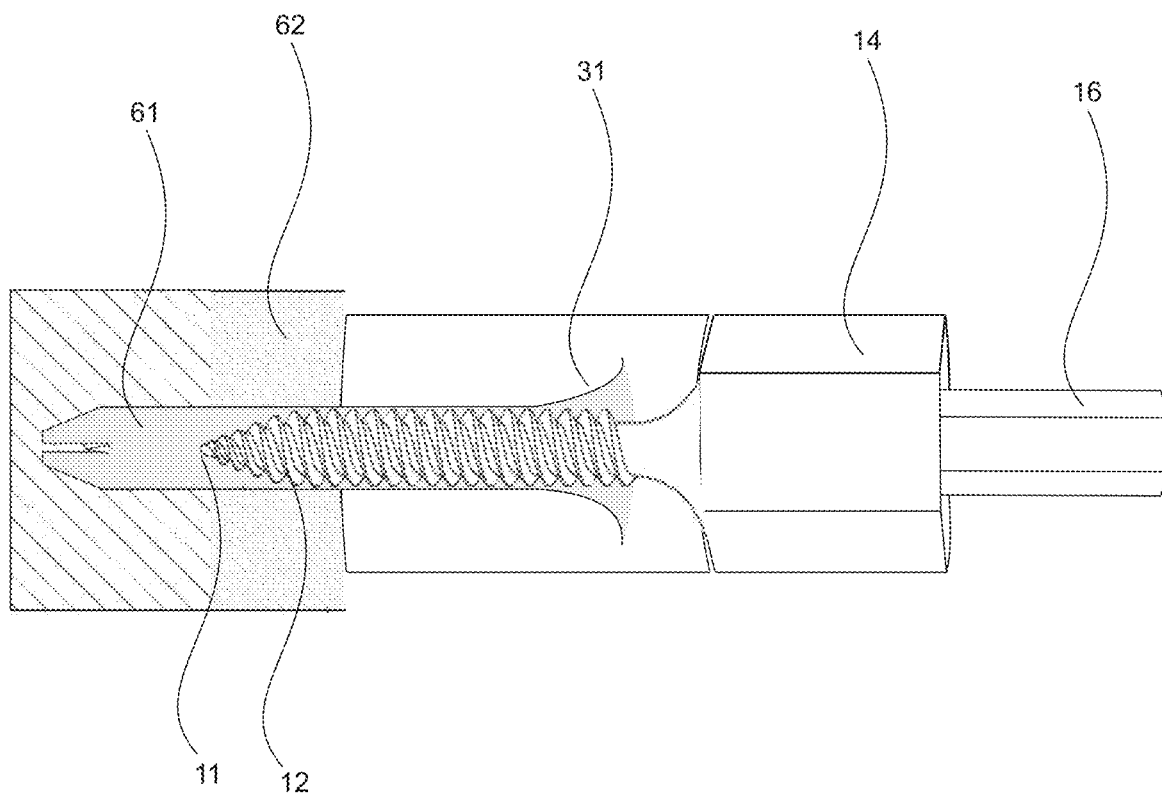
FIG. 11. Shows the cross-sectional view of how the wall plug is removed (61) with the device for removing wall plugs (51)
Figure 12:
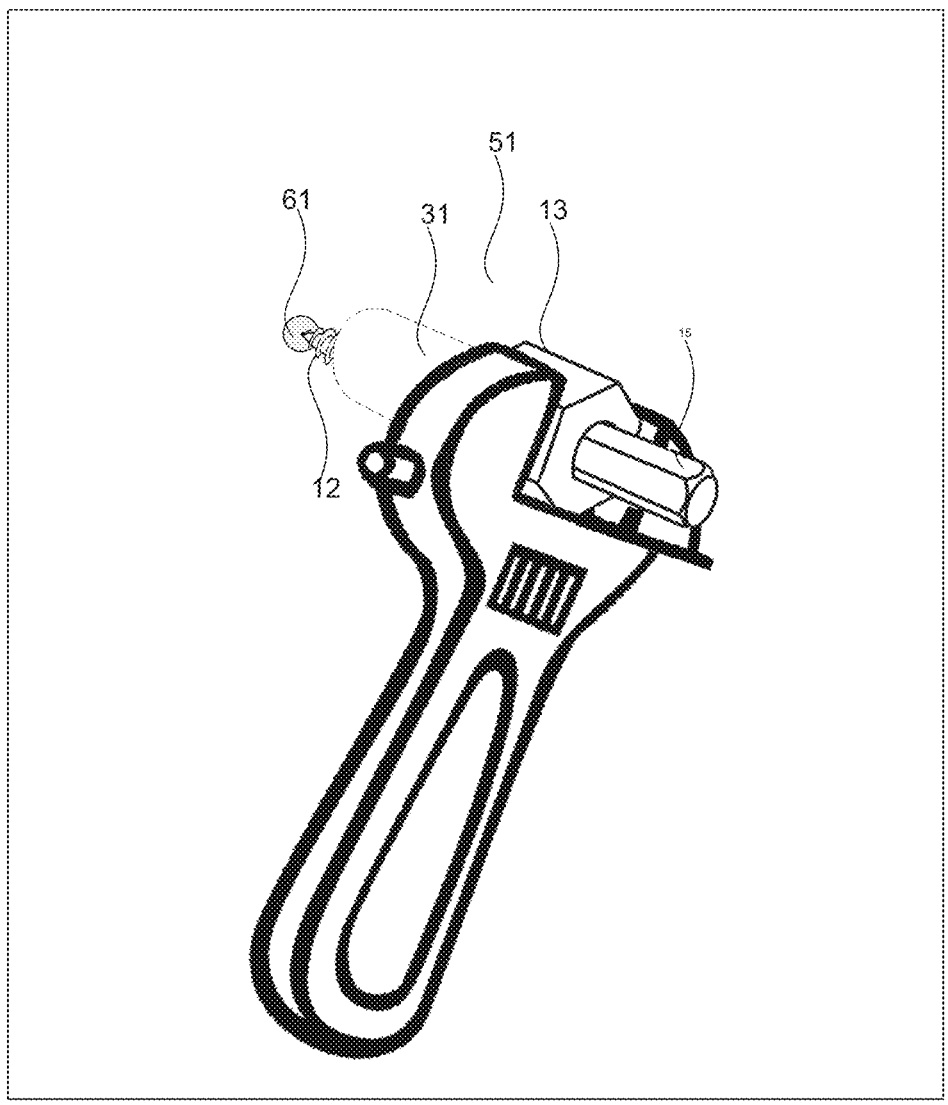
FIG. 12. Shows the perspective view of how a hand tool is used to rotate the device for removing wall plugs (51).

The device for removing wall plugs (51) works as follows:

1. The extractor bushing (31) is inserted into the screw for removing wall plugs (10), as can be seen in FIG. 5.
2. The screw tip (11) is inserted in the center of the wall plug (61) that is going to be extracted, as shown in FIG. 12.
3. With the help of a manual or electric tool, the screw for removing wall plugs must be turned clockwise, as shown in FIG. 12.
4. The screw for removing wall plugs (10) is turned until the plug is completely extracted and is inserted in the thread of the Screw (12) of the screw for removing wall plugs (10), as shown in FIG. 10 and FIG. 11.
5. The device for removing wall plugs (51) must be removed from the wall.
6. The extractor bushing (31) is disengaged from the screw for removing wall plugs (10).
7. The wall plug (61) is released from the screw for removing wall plugs (10).

The invention claimed is:

1. A device for removing wall plugs (51); comprising:
   a screw (10) for removing the wall plugs formed by a longitudinal element with a double head that has a screw rope (12), a manual turning head (13) and an electric turning head (15);
   wherein the screw rope (12) is a longitudinal element with an external threading that serves for insertion into a wall plugs (61), at a first end has a screw tip (11), which is a conical element with external threading that serves to drill and break some
   residue inside the wall plugs (61); at second end of the screw rope (12) there is an expansion radius (21) with which the screw rope is attached to the manual turning head (13),
   wherein the expansion radius (21) is a conical element with a largest radius attached to the manual rotation head (13) to open and break the extracted part of the wall plug;
   wherein the manual turning head includes 6 sides of manual head (14), at a first end is attached to the expansion radius (21) and at a second end to the electric turning head (15); by a head base (17) an extractor bushing (31) made up of a cylindrical body, with an inner hollow extraction tunnel (33) that serves as a coupling to insert the screw for the removing wall plugs (10),
   wherein the extractor bushing (31) has a bushing side (32) with a smaller diameter than the manual turning head (13) and two identical ends, which have a centering angle (34) which is a reduction of the outer diameter to the inner diameter of the hub side (32).

2. The device for the removal of wall plugs (51), according to claim 1, wherein the manual turning head (13) and the electric turning head (15) have the same number of sides or different amount of sides each; wherein the manual turning head (13) has a radius or width greater than a radius or width of the electric turning head (15).

3. The device for the extraction of wall plugs (51), according to claim 1, wherein the head base has a geometrical shape with at least 4 sides wherein the diameter or width of the base de cabezal (17) is greater than the radius of the extractor bushing (31) for the proper functioning of the device for removing wall plugs (51).

4. The device for the extraction of wall plugs (51) according to claim 3, wherein the head base has a hexagonal shape.

* * * * *